Oct. 13, 1936.     L. L. ALNETT, JR., ET AL     2,057,321
TIRE GAUGE
Filed April 14, 1934
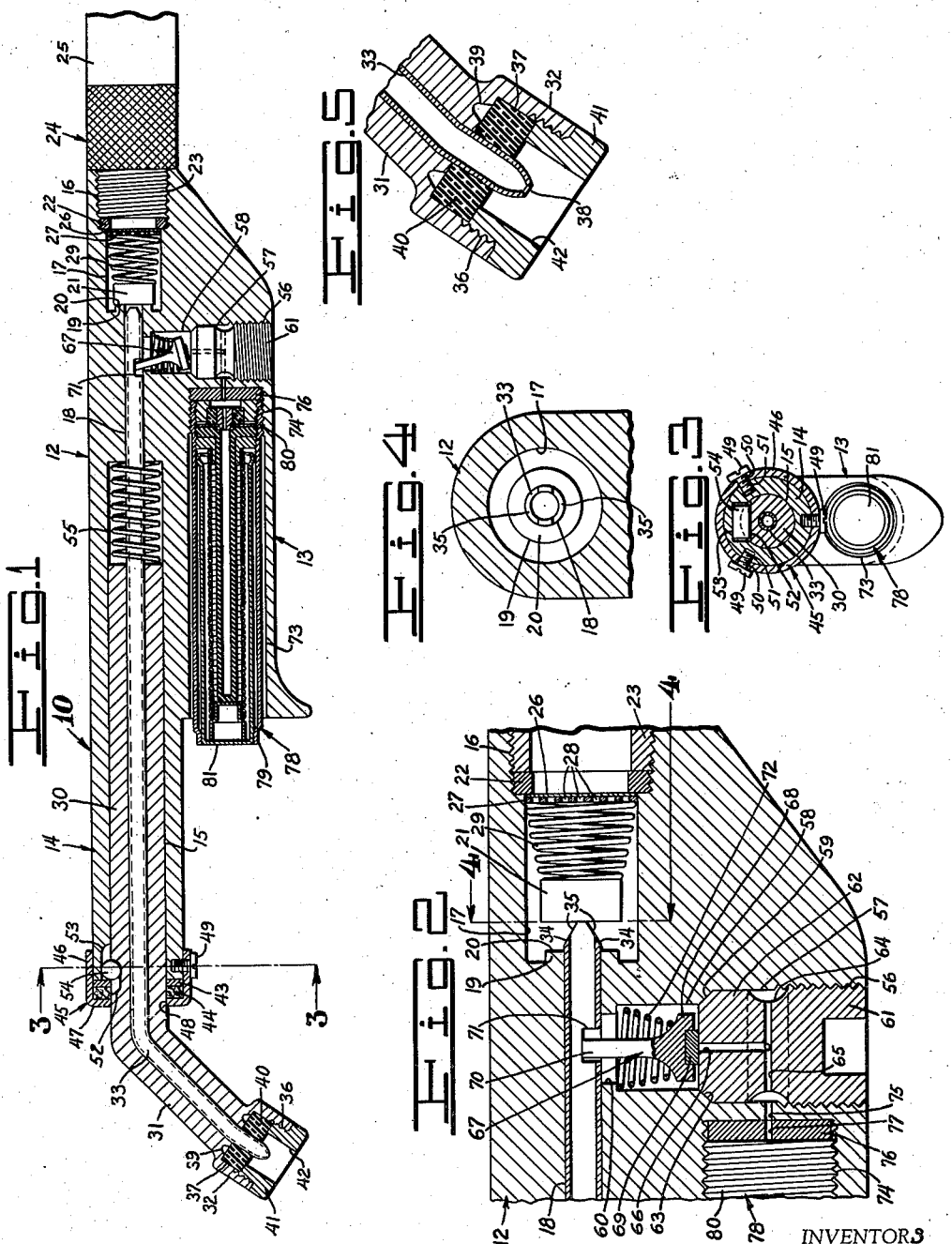
INVENTORS
L.L. Alnett Jr.
H.T.M. Rice
BY
ATTORNEY Patented Oct. 13, 1936

2,057,321

UNITED STATES PATENT OFFICE 2,057,321

TIRE GAUGE

Lawrence L. Alnett, Jr., Los Angeles, and Henry T. M. Rice, San Gabriel, Calif.

Application April 14, 1934, Serial No. 720,548

2 Claims. (Cl. 152—11.5)

This invention relates to improvements in pressure gauges.

The general object of the invention is to provide an improved air pressure gauge for inflating pneumatic tires.

Another object of the invention is to provide an improved air hose discharge nozzle for inflating pneumatic tires which includes novel means for indicating the air pressure in the tire.

Other objects and the advantages of this invention will be apparent from the following description taken in connection with the accompanying drawing wherein:

Fig. 1 is a central vertical longitudinal section through our improved pressure gauge;

Fig. 2 is an enlarged fragmentary view similar to Fig. 1;

Fig. 3 is a section taken on line 3—3 of Fig. 1;

Fig. 4 is a section taken on line 4—4 of Fig. 2; and

Fig. 5 is an enlarged fragmentary section of the discharge end of the device.

Referring to the drawing by reference characters we have indicated our improved pressure gauge generally at 10. As shown the device includes a body portion 12 which is preferably made of aluminum and comprises an enlarged gripping portion 13 having a reduced annular neck portion 14 extending forwardly therefrom at the top thereof. In the neck 14 and the forward portion of the gripping portion 13 we provide an annular recess 15 and adjacent the rear of the device we provide a threaded recess 16 which is coaxial with the recess 15.

The recess 16 communicates with a reduced recess 17 the bottom of which is spaced from the bottom of the recess 15 and communicating with the recess 15 and the recess 17 we provide a reduced aperture 18. Surrounding the aperture 18 in the recess 17 we provide a boss portion 19 the rear face 20 of which is adapted to form a valve seat. Positioned in the recess 17 we provide a fiber valve member 21 which is adapted to engage the valve seat 20 to restrict passageway from the recess 17 to the aperture 18.

Positioned in the threaded recess 18 we provide a fiber washer 22 which is adapted to be engaged by a threaded portion 23 of a hose coupling member 24 which may be of any desired type to operatively connect a hose 25 to the device 10.

Abutting the inner face of the fiber washer 22 and extending across the aperture thereof we provide a piece of felt 26 and abutting the inner face of the felt 26 we provide a metal disk 27 which includes a plurality of perforations as indicated at 28. Positioned in the recess we provide a coiled spring 29 one end of which engages the disk 27 and the opposite end of the valve member 21 to resiliently retain the valve 21 in engagement with the valve seat 20.

Positioned in the recess 15 we provide a plunger member 30 the outer end of which is inclined downward as at 31 and terminates in an enlarged head portion 32. The plunger 30 is preferably made of cast aluminum and has a brass tube 33 cast therein. The tube 33 extends rearwardly from the rear end of the plunger 30 and is slidably positioned in the aperture 18. At its rear end the tube 33 is cut on a bevel on opposite sides as indicated at 34 to leave apertures 35 which open through the sides of the tube. The enlarged head 32 of the plunger 30 includes a threaded recess 36 which communicates with a coaxial reduced recess 37. The forward end of the tube 33 extends into the threaded recess 36 and is spun together leaving a reduced aperture 38 communicating with the interior of the tube. In the bottom of the recess 37 surrounding the tube 33 we provide a groove 39 and in the recess 37 surrounding the tube 33 we provide a rubber washer 40.

Positioned in the threaded aperture 36 we provide a nut member 41 which engages the rubber washer 40 and squeezes it into tight engagement with the sides of the tube 33 and the walls of the recess 36. The nut 41 includes an aperture 42 which is of greater diameter than the tube 33 and into which the end of the tube projects beyond the outer face of the rubber washer 40. Surrounding the plunger 30 and abutting the end of the neck portion 14 we provide a steel washer 43 and surrounding the plunger 30 and abutting the outer face of the steel washer 43 we provide a felt washer 44.

On the end of the neck portion 14 we provide a cap member 45 which includes side walls 46 which engage the outer surface of the neck and an end wall 47 having an aperture 48 therein through which the plunger 30 extends. The end wall 47 of the cap engages the felt washer 44 and retains it firmly against the steel washer 43 and the steel washer firmly against the end of the neck 14. A plurality of set screws 49 which are positioned in apertures 50 in the side walls 46 of the cap engage threaded apertures 51 in the neck 14 to secure the cap in position.

In the upper surface of the plunger 30 adjacent the end of the neck we provide a groove 52 and thereabove in the neck we provide a groove 53. Positioned half in the groove 52 and half in the groove 53 we provide a steel roller member 54. Positioned in the neck recess 15 surrounding the tube 33 we provide a coiled spring 55 one end of which engages the bottom of the recess and the opposite end engages the inner end of the plunger 30 and resiliently retains the plunger 30 in a forward position. The forward movement of the plunger 30 is restricted by the roller 54 engaging the steel washer 43. The groove 53 in the neck is elongated to allow the plunger 30 to be moved rearwardly against the action of the spring 55.

When the plunger 30 is in a forward position as shown in Fig. 1 the rear end of the tube 33 is positioned forward of the valve seat 20 out of engagement with the valve 21. When the plunger 30 is moved rearwardly the rear end of the tube 33 engages the valve 21 and moves it against the action of the spring 29 away from the valve seat 20 thereby allowing free passageway from the recess 17 through the tube apertures 35 into the interior of the tube.

In the grip portion 13 adjacent the rear thereof we provide a threaded vertical recess 56 which communicates with a reduced coaxial recess 57 which in turn communicates with a reduced coaxial recess 58. The shoulder at the juncture of the recesses 57 and 58 is beveled to form a seat portion 59. The recess 58 communicates with the horizontal aperture 18 through a reduced aperture 60.

Positioned in the threaded recess 56 we provide a similarly threaded plug member 61 which includes a reduced portion 62 which fits snugly in the recess 57. The end of the reduced portion of the plug 56 is beveled as at 63 and tightly engages the seat portion 59. Adjacent the juncture of the threaded portion and the reduced portion of the plug 61 we provide an annular groove 64 in the outer surface of the reduced portion 62 and in the plug we provide a plurality of radiating apertures 65 which open into the groove 64. Opening through the end of the reduced portion 62 of the plug and communicating with the apertures 65 we provide an aperture 66.

For restricting passage from the recess 58 into the plug aperture 66 we provide a valve member 67. As shown the valve member 67 is made of metal and includes a head portion 68 having a fiber member 69 inserted in the lower portion thereof and which extends below the lower face of the valve and engages the upper face of the plug to close the end of the plug aperture 66. Extending upwardly from the head portion 68 the valve 67 includes a reduced stem 70 which extends through the aperture 60 into the interior of the tube 33 and through an aperture 71 provided in the tube 33. Positioned in the recess 58 we provide a coiled spring 72 which surrounds the valve stem 70 with one end engaging the bottom of the recess 58 and the opposite end of the head portion 68 of the valve to retain the fiber portion 69 of the valve in tight engagement with the end of the plug.

Opening through the forward end of the drip portion 13 we provide a horizontal recess 73 which communicates with a reduced threaded recess 74. The bottom of the recess 74 is spaced from the side of the vertical plug recesses and a small aperture 75 forms a communicating passageway between the recess 57 and the recess 74. The aperture 75 opens into the recess 57 adjacent the annular groove 64 in the plug 61. Positioned in the recess 74 and abutting the bottom thereof we provide a fiber packing disk 76 having an aperture 77 therein coaxial with the aperture 75. In the recess 73 we position an air gauge 78 which includes a housing 79 having a threaded portion 80 at its air receiving end. The air gauge 78 may be of any desired standard type such as are now on the market having a movable plunger 81 which is actuated by air to indicate the pressure of air admitted into the gauge.

When the plunger 30 is in its normal or forward position as shown in Fig. 1 the rear edge of the aperture 71 in the tube 33 retains the valve 67 in a tilted position wherein the fiber member 69 of the valve is raised from the face of the reduced portion of the plug 61. When the valve 67 is in this position there is an unrestricted passageway from the end 38 of the tube 33 through the tube and through the aperture 71 therein to the recess 58 and through the plug aperture 69 and the apertures 65 to the plug groove 64 and then through the aperture 75 and the aperture 77 in the fiber washer to the air gauge 78.

In operation when air under pressure is conducted from a suitable source (not shown) through the hose 25 to the device 10 the valve 21 prevents the air from entering the tube 33 by restricting the passageway from the recess 17 to the aperture 18, as previously described.

If an operator wishes to test the air pressure in a pneumatic tire he holds the plunger 30 in its normal forward position and places the end of the tire valve in the aperture 42 of the head nut 41. In this position the end of the tube 33 engages the stem of the tire valve and moves it to an open position whereupon air from the tire passes into the tube 33 and out therefrom through the aperture 71 into the recess 58, thence through the plug apertures 66 and 65 and through the apertures 75 and 76, as previously described, into the air gauge 78 where it actuates the plunger 81 to indicate the pounds of air pressure in the tire.

If the air pressure in the tire is insufficient the operator presses on the device 10 to move the plunger 30 rearwardly against the action of the spring 55. When the plunger 30 is thus moved rearwardly the tube 33 is moved therewith whereupon the tube aperture 71 moves to a position wherein the rear edge thereof disengages the stem 70 of the valve 67 whereupon the spring 72 forces the fiber portion 69 of the valve into engagement with the end of the plug thereby restricting passageway into the plug aperture 66. Furthermore, as the tube 33 moves rearwardly the rear end thereof engages the valve 21 and moves it away from the valve seat 20 whereupon the air from the hose 25 enters the tube 33 through the apertures 35 passing therethrough and out the reduced end 38 into the tire valve. When sufficient air is admitted to the tire the plunger is allowed to return to its initial forward position and when its associated seat 20 by the spring 29 and the valve 67 is again tilted to allow entrance into the plug aperture 66.

From the foregoing description it will be apparent that I have provided an improved air hose discharge nozzle which is novel in construction and simple in operation and highly efficient in use.

Having thus described our invention, we claim:

1. An air hose discharge nozzle comprising a body portion having aligned recesses therein connected by a passageway, a tubular plunger mounted in one of said recesses for limited longitudinal movement, a spring urging said plunger to its extended position, a valve in the other of said recesses spring pressed to normally close the passageway, said other recess being adapted for connection to an air hose, an extension on the plunger extending through the passageway and adapted when the plunger is forced inward to unseat the valve, a lateral recess in the body portion opening into said passageway and a gauge chamber connected to said lateral recess by a restricted passage, a spring pressed valve in the lateral recess to close communication between said recess and the restricted passage, said valve having a stem projecting into the first mentioned passageway, the plunger extension being provided with a notch for engagement with said stem to unseat the valve when the plunger is in its extended position and to release the valve for seating when the plunger is forced inward, a connector on the outer end of the tubular plunger for connection to a tire and a gauge in the gauge chamber operative by air pressure entering through the restricted passage.

2. An air hose discharge nozzle comprising a body portion having aligned recesses therein connected by a passageway, a tubular plunger mounted in one of said recesses for limited longitudinal movement, a spring urging said plunger to its extended position, a valve in the other of said recesses spring pressed to normally close the passageway, said other recess being adapted for connection to an air hose, an extension on the plunger extending through the passageway and adapted when the plunger is forced inward to unseat the valve, a lateral recess in the body portion opening into said passageway and a gauge chamber connected to said lateral recess by a restricted passage, a threaded plug closing the outer end of said lateral recess and provided with a valve seat on its inner end communicating by a passageway with the restricted passage, a spring pressed valve in the lateral recess to close communication between said recess and the restricted passage, said valve having a stem projecting into the first mentioned passageway, the plunger extension being provided with a notch for engagement with said stem to unseat the valve when the plunger is in its extended position and to release the valve for seating when the plunger is forced inward, a connector on the outer end of the tubular plunger for connection to a tire and a gauge in the gauge chamber operative by air pressure entering through the restricted passage.

LAWRENCE L. ALNETT, Jr.
HENRY T. M. RICE.